C. W. SAALBURG.
PLATE HOLDER FOR MAKING CHANGEABLE PICTURES.
APPLICATION FILED NOV. 28, 1917. RENEWED DEC. 13, 1919.
1,347,794.                                Patented July 27, 1920.
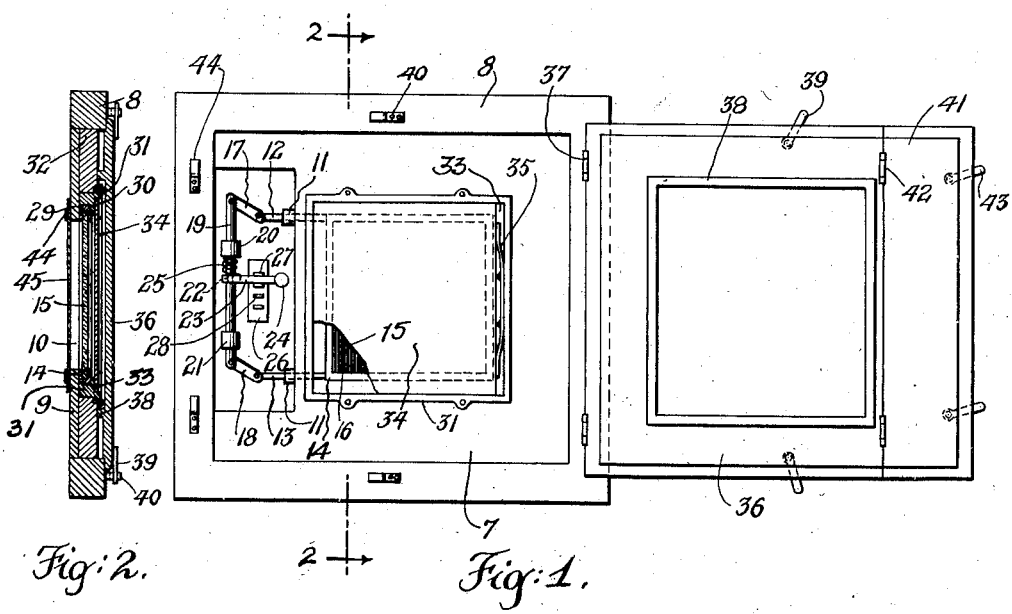

UNITED STATES PATENT OFFICE.

CHARLES W. SAALBURG, OF NEW YORK, N. Y., ASSIGNOR TO ANIMATED PICTURE PRODUCTS COMPANY, OF NEW YORK, N. Y., A CORPORATION OF DELAWARE.

PLATE-HOLDER FOR MAKING CHANGEABLE PICTURES.

1,347,794.     Specification of Letters Patent.     Patented July 27, 1920.

Application filed November 28, 1917, Serial No. 204,358. Renewed December 13, 1919. Serial No. 344,597.

*To all whom it may concern:*

Be it known that I, CHARLES W. SAALBURG, of New York, in the county of New York and in the State of New York, have invented a certain new and useful Improvement in Plate-Holders for Making Changeable Pictures, and do hereby declare that the following is a full, clear, and exact description thereof.

My invention relates particularly to an apparatus to be used for taking pictures adapted to change or give the effect of motion when viewed at different angles.

The object of my invention is to provide a camera of the above type which will permit the taking of composite pictures comprising a plurality of different pictures arranged in alternating lines, and which are very exactly placed in regard to one another, so as to obtain very accurately and completely the change from one picture to another when the composite picture is viewed from different angles. The object of my invention is particularly to provide an apparatus of this character which will enable pictures of large size to be taken while the different pictures comprised in the composite picture will occupy very exactly their different positions, and in such a way that the lines in the said pictures are in exactly parallel positions. Another object of my invention is to provide a shifting mechanism for the screen in the camera which is protected from displacement between the operations thereof. Further objects of my invention will appear from the detailed description of the same contained hereinafter.

While my invention is capable of embodiment in many different forms, for the purpose of illustration I have shown only one form thereof in the accompanying drawings, in which, Figure 1 is a rear elevation of the plate-holding frame; and Fig. 2 is a vertical section of the same on line 2—2.

In the drawings I have shown a plate-holding apparatus 7 which may be mounted in any suitable manner on a camera (not shown). The apparatus 7 comprises an outer frame 8 having within the same and near the front thereof, a thin frame 9 provided with an opening 10 to admit light. In the rear of said frame 9 there are a pair of guides 11 carried upon the frame 9 to receive sliding bars 12 and 13 connected to a frame 14 carrying a screen 15 made of a sheet of glass and having a plurality of vertical opaque lines 16. The sliding bars 12 and 13 are connected at their other ends to links 17 and 18 respectively, and said links 17 and 18 are connected at their remaining ends to a sliding bar 19 carried in guides 20 and 21 also on the frame 9. In the center of the rod 19 there is an annular recess 22 to receive a rotary stop 23 having a handle 24. The stop 23 is normally pressed by means of a spring 25 against the plate 26 on the frame 9, said plate carrying two pairs of lugs 27 and 28 to position the stop 23. The frame 14 has beveled edges 29 to fit within correspondingly shaped recesses 30 in a stationary frame 31 attached to an inner frame 32 adjacent to the frame 9. The stationary frame 31 is, furthermore, provided with a recess 33 to receive a sensitive plate 34 which is maintained securely in position by means of a spring 35 secured in the recess 33. Upon the rear of the outer frame 7 there is a cover 36 attached thereto by hinges 37. Said cover has upon its inner face a forwardly projecting ridge 38 to fit around the frame 30 so as to prevent access of light to the plate 34. Pivoted catches 39 coöperate with angle bars 40 on the frame 8 to hold the cover 36 in place. Attached to the free edge of the cover 36 there is a movable portion 41 carried upon hinges 42 and which is provided with pivoted catches 43 to engage with angle bars 44 on the frame 8. Upon the front of the frame 9 there is, furthermore, provided a three-sided bracket 44 to receive a shutter 45 which may be pulled out to expose the plate 33 in the camera.

In the operation of my invention, when it is desired to take a composite picture the plate-holding device 7 is inserted in the recess 6 and the camera is focused in the usual way. Thereupon an exposure of the plate 34 is made with the screen 15 in one position as shown in Fig. 1. After this exposure has been made, the stop 23 is then shifted to the position between the lugs 28, this being accomplished by moving the portion 41 upon the hinges 42 to give access to the handle 24 on the interior of the frame 8. While the stop 23 is being shifted light cannot reach the plate 34 because of the projection 38. The portion 41 is then closed. This shifts the screen 15 so that the lines 16 occupy the position formerly occupied by the intervals between said lines. Another exposure is now made and the negative 34 now ready for developing, etc. so as to produce a composite negative carrying two different pictures located in alternating lines thereon. These two pictures may be of two different subjects or they may be two positions of a moving object. From this negative suitable positives may be made. The movement of the screen 15 by this mechanism insures the maintenance of the upper and lower portions of the screen 15 in the same relative positions in the different positions of said screen. In other words, in the two positions of the screen, the lines 16 therein will be exactly parallel to one another and in this way the composite picture will be very accurately taken. This is important as the lines in the screens are often very fine and very close together and an inaccuracy in their location will be apparent in the pictures produced thereby. When viewed the whole of one of the pictures will be visible while the other picture will be entirely cut off from view. Furthermore, while the pictures are being taken there is no danger of the incidental displacement of the screen positioning mechanism, as it is located inside of the frame. However, when the shifting mechanism is being operated light is excluded from the sensitive plate.

While I have described my invention above in detail, I wish it to be understood that many changes may be made therein without departing from the spirit of my invention.

I claim:

1. In a device of the character described, the combination of means for holding a lined screen, and means for shifting the same while maintaining the lines parallel in the two positions, comprising devices attached to the two ends of the screen, including sliding bars and links connected thereto.

2. In a device of the character described, the combination of means for holding a lined screen, and means for shifting the same while maintaining the lines parallel in the two positions, comprising devices attached to the two ends of the screen, including sliding bars and links connected thereto, and a bar connecting the two links.

3. In a device of the character described, the combination of means for holding a lined screen, means for shifting the same while maintaining the lines parallel in the two positions, comprising devices attached to the two ends of the screen, including sliding bars and links connected thereto, a bar connecting the two links and a spring-pressed top coöperating with said last mentioned bar.

4. In a device of the character described, the combination of a frame, means for holding a lined screen, and means located entirely within said frame for shifting the same while maintaining the lines parallel in the two positions.

5. In a device of the character described, the combination of a frame, means for holding a lined screen, and means located within said frame for shifting the same while maintaining the lines parallel in the two positions, comprising devices attached to the two ends of the screen.

6. In a device of the character described, the combination of a frame, means for holding a lined screen, and means located within said frame for shifting the same while maintaining the lines parallel in the two positions, comprising devices attached to the two ends of the screen, including sliding bars and links connected thereto.

7. In a device of the character described, the combination of a frame, means for holding a lined screen, and means located within said frame for shifting the same while maintaining the lines parallel in the two positions, comprising devices attached to the two ends of the screen, including sliding bars and links connected thereto, and a bar connecting the two links.

8. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links and a spring-pressed stop coöperating with said last mentioned bar.

9. In a device of the character described, the combination of a frame, means for holding a lined screen, means located within said frame for shifting the same while maintaining the lines parallel in the two positions, and a cover for said frame.

10. In a device of the character described, the combination of a frame, means for holding a lined screen, means located entirely within said frame for shifting the same while maintaining the lines parallel in the two positions, comprising devices attached to the two ends of the screen, and a cover for said frame.

11. In a device of the character described, the combination of a frame, means for holding a lined screen, means located within said frame for shifting the same while maintaining the lines parallel in the two positions, comprising devices attached to the two ends of the screen, including sliding bars and links connected thereto, and a cover for said frame.

12. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links, and a cover for said frame.

13. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links, a spring-pressed stop coöperating with said last mentioned bar, and a cover for said frame.

14. In a device of the character described, the combination of a frame, means for holding a lined screen, means located within said frame for shifting the same while maintaining the lines parallel in the two positions, and a cover for said frame, said cover being provided with means permitting access to the shifting mechanism without exposing the sensitive plate to the light.

15. In a device of the character described, the combination of a frame, means for holding a lined screen, means located within said frame for shifting the same while maintaining the lines parallel in the two positions, comprising devices attached to the two ends of the screen, and a cover for said frame, said cover being provided with means permitting access to the shifting mechanism without exposing the sensitive plate to the light.

16. In a device of the character described, the combination of a frame, means for holding a lined screen, means located within said frame for shifting the same while maintaining the lines parallel in the two positions, comprising devices attached to the two ends of the screen, including sliding bars and links connected thereto, and a cover for said frame, said cover being provided with means permitting access to the shifting mechanism without exposing the sensitive plate to the light.

17. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links, and a cover for said frame, said cover being provided with means permitting access to the shifting mechanism without exposing the sensitive plate to the light.

18. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links, a spring-pressed stop coöperating with said last mentioned bar, and a cover for said frame, said cover being provided with means permitting access to the shifting mechanism without exposing the sensitive plate to the light.

19. In a device of the character described, the combination of a frame, means for holding a lined screen, means located within said frame for shifting the same while maintaining the lines parallel in the two positions, and a cover for said frame having a hinged flap, arranged to give access to the shifting mechanism without exposing the sensitive plate to the light.

20. In a device of the character described, the combination of a frame, means for holding a lined screen, means located within said frame for shifting the same while maintaining the lines parallel in the two positions, comprising devices attached to the two ends of the screen, and a cover for said frame having a hinged flap, arranged to give access to the shifting mechanism without exposing the sensitive plate to the light.

21. In a device of the character described, the combination of a frame, means for holding a lined screen, means located within said frame for shifting the same while maintaining the lines parallel in the two positions, comprising devices attached to the two ends of the screen, including sliding bars and links connected thereto, and a cover for said frame having a hinged flap, arranged to give access to the shifting mechanism without exposing the sensitive plate to the light.

22. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links, and a cover for said frame having a hinged flap, arranged to give access to the shifting mechanism without exposing the sensitive plate to the light.

23. In a device of the character described, the combination of a frame, means for holding a lined screen, means located within said frame for shifting the same while maintaining the lines parallel in the two positions, comprising devices attached to the two ends of the screen, including sliding bars and links connected thereto, a bar connecting the two links, a spring-pressed stop coöperating with said last mentioned bar, and a cover for said frame having a hinged flap, arranged to give access to the shifting mechanism without exposing the sensitive plate to the light.

In testimony that I claim the foregoing I have hereunto set my hand.

CHARLES W. SAALBURG.